(12) United States Patent
Hanchett et al.

(10) Patent No.: US 8,319,979 B2
(45) Date of Patent: Nov. 27, 2012

(54) SINGLE LASER BEAM MEASUREMENT SYSTEM

(75) Inventors: Mike Hanchett, Edmonds, WA (US); James Hartl, Snohomish, WA (US)

(73) Assignee: Advanced Measurement Systems, Erwah, TN (US)

( * ) Notice: Subject to any disclaimer, the term of this patent is extended or adjusted under 35 U.S.C. 154(b) by 214 days.

(21) Appl. No.: 12/925,700

(22) Filed: Oct. 26, 2010

(65) Prior Publication Data

US 2012/0099117 A1    Apr. 26, 2012

(51) Int. Cl.
*G01B 11/14* (2006.01)

(52) U.S. Cl. ....................................................... 356/625
(58) Field of Classification Search .................. None
See application file for complete search history.

(56) References Cited

U.S. PATENT DOCUMENTS 7,181,856 B1 * 2/2007 Hanchett et al. ................. 33/288
8,122,846 B2 * 2/2012 Stiblert et al. ................ 118/300

* cited by examiner

*Primary Examiner* — Tu Nguyen

(57) ABSTRACT

A single laser beam measurement system employing retro-reflective striped targets is disclosed having an error correction mechanism which compensates for errors arising from the target not being square to a laser scanning beam.

13 Claims, 2 Drawing Sheets

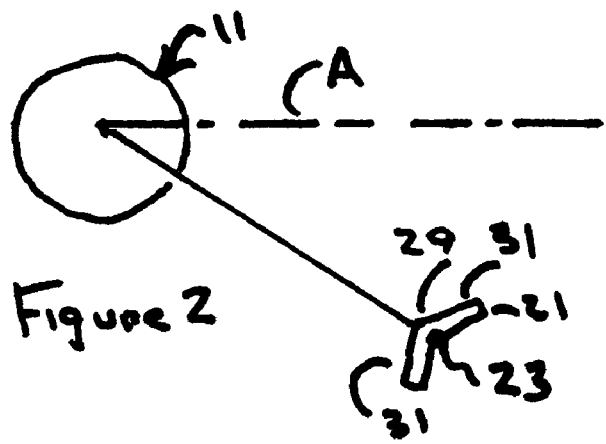
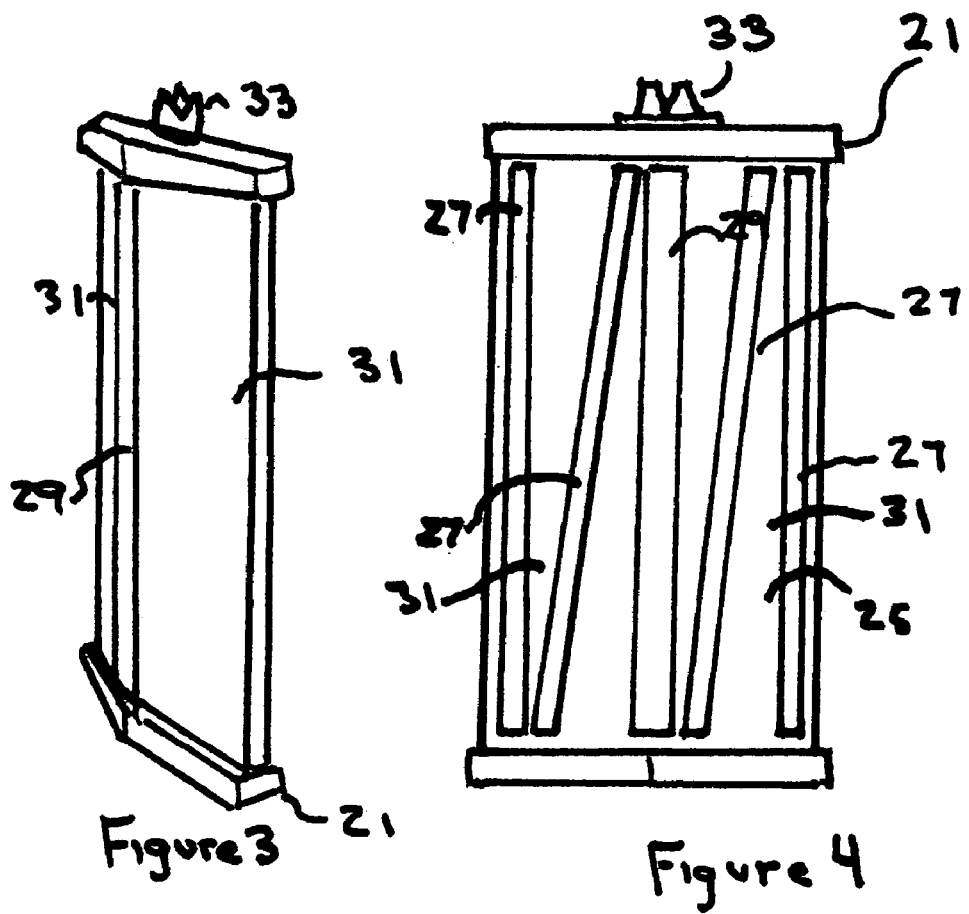

SINGLE LASER BEAM MEASUREMENT SYSTEM

BACKGROUND OF THE INVENTION

1. Field of the Invention

The present invention generally relates to a single laser beam measurement system, and more particularly to such a system having an error correction mechanism which compensates for errors arising from the target not being square to a laser scanning beam.

2. Description of the Related Art

Laser measurement systems or other light-based systems that employ triangulation to determine the position of retro-reflective targets position at specific known reference points, such as on the frame of a vehicle are known such as U.S. Pat. Nos. 4,997,283, 5,251,013 and 5,801,834, the entire disclosures of which are herein incorporated by reference.

In such a system, a laser beam is split into two laser beams by a 50/50 beam splitter, each beam then being directed to a rotating mirror of a laser scanner. The pair of spaced, rotating mirrors direct each laser beam in a 360 degree arc or circle, with both beams being directed in a single plane. The distance between the two laser beams forms the base of the triangle and the two angles generated by the rotating mirrors provide the position of a flat reflective target or targets positioned in the field of measurement.

The system requires each of the rotating mirrors to be "synched" to the mechanical centerline of the laser of the laser scanner which can introduce errors. The synch position is typically calibrated at the factory using a table with a precision grid of targets. There are several factors in addition to synch that are taken into account during this calibration. When the unit is put into the field and measurements taken in situ, it is common for this synch reference to move which causes measurement errors.

In the noted prior art design the two laser beams, spaced at a fixed distance apart (forming the base of the triangle) are swept across a reflective target having a width determined by a reflective stripe on each edge. The center of the two stripes is calculated and the intersection of the two base points across this point allows the position calculation. When using only one scanning laser beam instead of two, there are no longer intersecting points and the position of the target must be determined in a different manner.

The time of the sweep of a single laser beam across the face of the target could be used to determine distance from the laser. However when the target is rotated off perpendicular the width is foreshortened and the target appears to be farther away. This face angle error could be calculated by measuring the leading edge and comparing it to the trailing edge and corrected and compensated for but it is a sine function and very small. Therefore small angular changes of the target lead to large distance errors and it becomes difficult to determine the rotation angle of the target face to the level of accuracy required.

SUMMARY OF THE INVENTION

Because small angular changes of the target lead to large distance errors making it difficult to determine the rotation angle of a flat reflective target to the level of accuracy required, it is proposed by the present invention to place an angular bend in the face of the target which provides a far more accurate method of determining rotation angle and a correction for distance error.

If the target is a cylinder having a retro-reflective surface, there would be no face angle correction required. No matter how a cylinder is rotated, it still appears to have the same width. A half cylinder would yield the same results as long as it is not rotated completely out of range. So a partial cylinder, will give the same results. Thus an additional solution is to create a partial cylinder in the center of the target face. As long as both edges were visible to the laser, face angle error can be corrected.

According to one embodiment of the present invention, rather than comprising a cylinder or partial cylinder, the retro-reflective target comprises a pair of flat redundantly patterned retro-reflecting target faces having equal widths and positioned at a known angle to one another. By sensing the difference in the time it takes the scanning laser beam to traverse the redundant stripe patterns of each target face of the pair of target faces, a more accurate computation of face angle of the target is possible with a single scanning laser beam system.

Yet another embodiment of the target combines both solutions, joining the flat target faces at a bend having a known angle which forms a partial cylinder. Therefore, when viewed from above, the proposed combined target continues the vertical side edge of the partial cylinder in a straight line to form a V-shape with a rounded nose (the cylinder). As it turns out, the sine correction calculation is improved by a factor of 60 when the angled target of the present invention is used.

So the target is a virtual cylinder and has a shape that enhances the correction, either one would allow for a corrected answer, combined they yield an improved performance. It is the unique combination of a single laser scanner and virtual cylindrical targets that provided improved accuracy of measurement while eliminating measurement errors introduced by sync drift between a pair of rotating mirrors and/or angular displacement of a flat reflective target. In addition a dual laser scanner can work with the new cylindrical targets (given the appropriate software).

REFERENCE TO DRAWINGS

One embodiment of the single laser rotating scanner head configuration is shown in FIG. 1;

FIG. 2 illustrates the operation of the laser measurement system of the present invention;

FIG. 3 is a perspective view of the target according to the present invention; and FIG. 4 is a planar front view of one embodiment of the target of FIG. 3 illustrating a pattern of retro-reflective stripes on the face thereof.

DETAILED DESCRIPTIONS OF PREFERRED EMBODIMENTS OF THE PRESENT INVENTION

Figure 1:
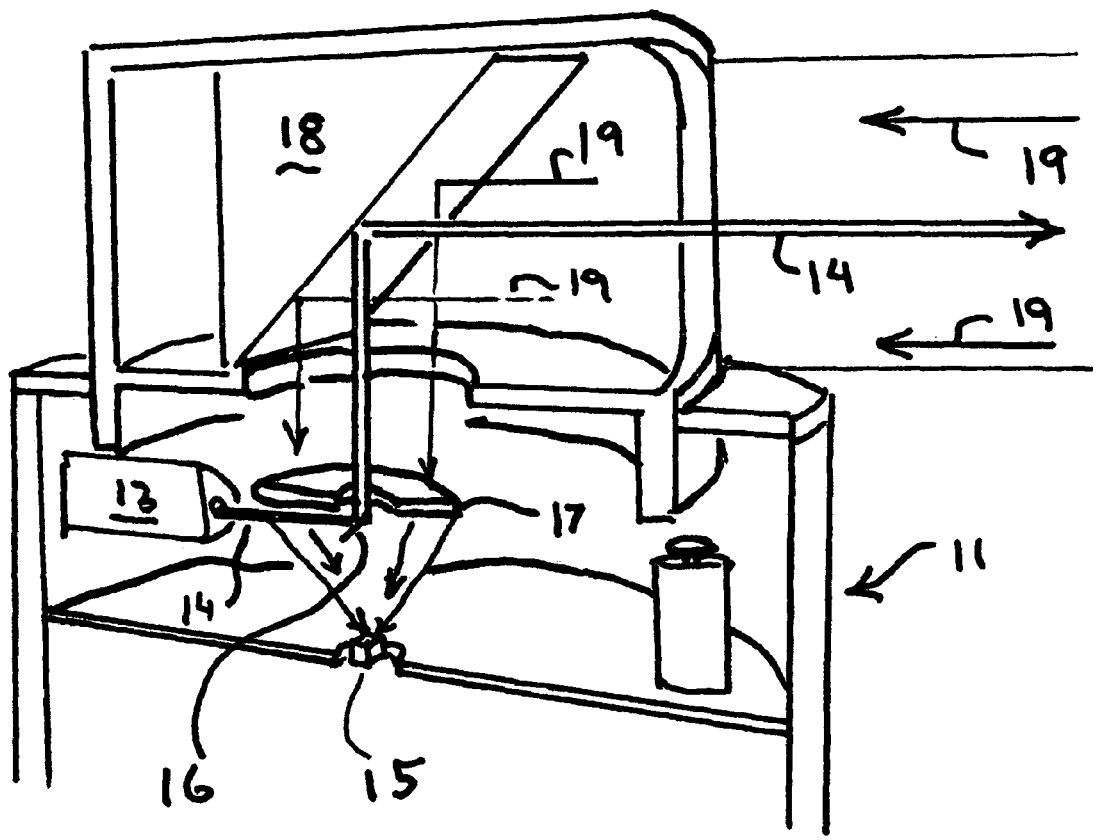

In this invention, a single scanner head 11, as shown in FIG. 1, of a computer controlled laser measurement system is located within the field of measurement, for example, to measure how bent or out of shape an automobile frame is from manufacturer's specifications. The scanner head 11 illustrated in FIG. 1 comprises a rotating assembly containing a laser source 13 which provides a scanning laser beam 14 reflected by a mirror 16 onto a rotating mirror 18 of the scanner head 11. The scanner head 11 further includes detection optics comprising a photo detector 15 and Fresnel lens 17 for concentrating return light 19 back onto the photo detector 15.

As shown in FIG. 2, as the scanner head 11 rotates, the angle from a known reference index position A to a retro-reflective striped target 21 (FIG. 4), attached by a stem 23 to a point to be measured. Measuring the time from an index event to a striped target event and comparing this interval to the period between index events is used to measure the angle. This angular measurement technique employs a constant rate of rotation of the laser beam 24 over the period of each rotation. Distance to the target 21 is determined by the total rotation period (for example, the time it takes for the scanner head 11 to complete one rotation) and the time it takes for the laser beam 14 to traverse the width of the target 21.

Referring to FIG. 4, the target face 25 is standardized in width and has retro-reflective stripes 27 that return the laser beam 14 back to the photo-detector 15. According to one embodiment of the present invention as best shown in FIGS. 2 and 3, the target face 25 comprises two bend faces 31 each having the same pattern of reflective stripes 27 joined at an angular bend 29.

By computing the XY locations of each stripe 27 on a target 21 and by knowing the characteristic pattern and dimensions of the target it is possible to determine the XY location of the target and the height of the beams crossing the target face. Each of these events are time stamped relative to the reference index position A. The time it takes for the laser beam 14 to scan across the width of the target 21 provides the distance information. The diagonal stripes 27 are used to calculate the height of the laser beam 14 on the target 21. The sequence and width of stripes 27 also can also be used to provide a unique address specific to each of the targets 21.

In the following example of one embodiment of the present invention, the targets 21 only have one unique identification code embedded in their bar code. Their position in the measurement area is determined by their actual location in space. Applicants have coined this "spatial addressing". The location (or spatial address) of each target 21 provides the unique identification information required to match position of each target 21 to the coordinate system of, for example, reference points of a vehicle frame. If three targets are identified at specific reference locations, the remaining targets can be transformed to coincide with their locations under the vehicle. Other methods of fitting the target locations to the vehicle specifications can be employed such as a least square fit of all the data.

Angular data for each of the stripe edges sensed during a complete revolution of the laser beam 14 is collected and then analyzed by pattern recognition software to identify each target 21 uniquely in the scanned data. With this information it is now possible to identify angular events from the data corresponding to specific edges of specific stripes 27 on each target 21.

Prior to calculating the target coordinates, any errors caused by the mechanical construction of the system must be corrected for. Some of these error sources include: mechanical offset of the laser axis from the center of rotation in, offset of the mirror surface from the axis of rotation, beam displacement due to transmission through windows, non-perpendicularity of the laser beams to the axis of rotations, errors in parallelism of the axis's of rotation, tilt of the mirror surface relative to the axis of rotation for a mirror scanned system and curvature and non-parallelism of mirror surfaces.

Some of the previously mentioned error sources can be minimized by mechanical adjustment of the various components of the system such as cone error and sine error. Other error sources may not be adjusted, such as the displacement of a laser beam as it passes at an angle through a window. Typically a combination of mechanical adjustment, and software calibration based on testing with targets at known positions is used to correct for these deviations.

The most significant error contributor in a single laser beam measurement system is the face angle/distance error created when the target 21 is rotated off perpendicular relative to the laser beam, i.e., target face not square to the scanning laser beam 14. Distance is determined from the known width of the target 21 and the RPM of the laser beam 14. If the target 21 is rotated the width is foreshortened and creates an apparent increase in distance from the laser. This error is the dominant reason that a single line laser is not used in a measurement system of this type.

A novel approach is proposed to solve for this problem. Rotation angle can be determined by measuring the position of the leading edge and comparing it to position of the trailing edge for comparison and correction. As noted above, because small angular changes of the target lead to large distance errors, it becomes difficult to determine the rotation angle to the level of accuracy required. It is proposed to place an angular bend 29 in the face of the target 21 which provides a far more accurate method of determining rotation angle and a correction for distance error. If the target 21 was a cylinder, there would be no face angle correction required so an additional solution is to create a partial cylinder in the center of the target face as best shown in FIGS. 2 and 3. As long as both edges of the bend 29 are visible to the laser beam 14, face angle of the target can be corrected. If the angle of the target face caused the scanning laser beam 14 to be blocked from impinging on either the leading or trailing edge of the bend 29, the redundant calculations from the bent faces 31 can be used to correct for the non-perpendicular face angle of the target 21 and/or direct the user to reposition the target for better accuracy.

In prior art, target designs used flat target faces and as the target is rotated to any angle other than a direct perpendicular line to the laser, all the bar data is foreshortened. With the bent target faces 31 and cylindrical stripe 29 at the center of the target 21, as the target 21 of the present invention is rotated in either direction one side of the target is moving toward the scanner and the other is moving away. By determining the amplification of the rotation angle from normal by sensing the degree of rotation caused by the difference in the time it takes the scanning laser beam 14 to traverse the redundant stripe pattern of bent face 31, a more accurate computation of face angle of the target is possible with a single scanning laser beam system.

By computing the XY locations of each stripe 27 on a target 29 and by knowing the characteristic pattern of stripes and dimensions of the target 21, it is possible to determine the XY location of the target and the height of the scanning laser beam 14 crossing the target face. This timing information is recorded and transmitted to the system host computer (PC) via, for example, a cable or RF data-link. Alternatively the X, Y and Z information could be calculated by the laser scanning head 11 and transmitted in this form to the host PC.

When measuring the deformation of vehicle frame, the targets 21 are hung by stems 23 from holes positioned at reference specification points on the vehicle frame. Then actual position of the targets is compared with specification point of the corresponding reference point to determine the extent of deformation of the frame. However, it important to make sure the stems 23 are of the appropriate length to place the target 21 in view of the laser scanning beam 14.

Accordingly, in one embodiment of the present invention, each of the targets 21 can have a unique address embedded in the bar code to tell the operator the correct stem length of the stem 23 to be used to attach the target 21 to a specific specification point on the underside of the vehicle (FIG. 2).

As noted before, Applicants propose to have a common face pattern of retro-reflective stripes 27 for all targets 21 creating "spatial addressing" thus eliminating the need for a bar code to uniquely identify each target 21. Because the datum of the vehicle frame specification points is predetermined and the relative heights of the specification points are known, the required stem length to place each of the targets 21 in view of the scanner 11 can be computed. The stems 23 of this embodiment of the present invention are have different lengths and interchangeable from target to target. This eliminates the need for a unique target address. The stem length can then be added to the height of the laser on the target face to determine the height of the measured point.

The stem 23 has, for example, a ball connector on both ends allowing to be easily attached to the adaptor hung from the vehicle reference point and a resilient socket 33 the target 21. The length of the stem is calculated/predicted from the datum and displayed as the preferred choice. In the event that the stem does not place the target in the measurement plane, the tech simply selects the length of stem that does and notes this in the software. In addition each scanner 11 has tilt sensors for measuring the pitch and roll of the scanner 11 and this information is periodically interrogated by the system PC via the data link.

Having computed the XY positions of the height sensitive detectors on each target and by reading the Z height, stem length and target tilt information from each target, the system PC can compute the XYZ location of each stem attachment point to the vehicle frame specification point. These calculated positions can then be corrected for the pitch and roll of the scanned vehicle using the tilt sensor information transmitted from the scanner.

Although the present invention has been described in terms of specific exemplary embodiments, it will be appreciated that various modifications and alterations might be made by those skilled in the art without departing from the spirit and scope of the invention as specified in the following claims.

What is claimed is:

1. A laser measurement system for determining the difference between the actual three-dimensional configuration of a vehicle frame requiring repair and the normal three-dimensional configuration of the vehicle frame as defined by the manufacturer to determine the extent of deformation of the vehicle frame and the necessary repairs required to the vehicle frame, the system comprising:
   a rotating laser scanner having a single scanning laser beam having a known constant speed of rotation and a reference position; the scanner further including detection optics for detecting reflected light from the laser beam
   a plurality of retro-reflective targets each having a target face with a known target width, a known pattern of slanted retro-reflective stripes on the target face, retro-reflective stripes at the vertical edges of the target face to denote its width, and mean for attachment the target to the vehicle frame at a give reference point having a corresponding normal reference point value as defined by the manufacturer,
   wherein the time interval between light reflected by the retro-reflective stripes at the vertical edges of the target is sensed by the scanner detection optics to determine the time it takes the scanning laser beam to traverse the known width of the target face to provide distance position data for each target;
   wherein the time interval between light reflected by the slanted retro-reflective stripes is sensed by the scanner detection optics to determine vertical position data of the laser scanning beam on the target face;
   wherein the time interval between the scanner reference position and light reflected from each target is sensed to determine the angular position of each target relative to the scanner reference position; and
   wherein each target face is cylindrically shaped;
   positioning means for positioning each target within view of the scanning laser beam at a known vertical distance from the associated reference point; and
   means for receiving position data from all the targets to determine an actual position of each reference point relative to a normal position of the reference point as determined by the manufacturer's specifications.

2. A laser measurement system according to claim 1, wherein the positioning means has a known length and means for attachment to the vehicle frame and the target.

3. A laser measurement system according to claim 2, wherein the target further includes a connection means for connecting the target to the positioning means.

4. A laser measurement system according to claim 3, wherein the connection means is adapted to permit the target to hang plumb under the influence of gravity from the vehicle reference point.

5. A laser measurement system according to claim 4, wherein the target includes means for communicating the known length of the positioning means.

6. A laser measurement system according to claim 1, wherein the target face comprises a pair of flat target faces positioned at a known angle to one another, each flat target face having a known width and redundant patterns of vertical stripes for denoting the width of the target face and slanted retro-reflective stripes, the flat target faces being joined at an angular bend;
   wherein the difference between the time it takes the scanning laser beam to traverse the relative widths of the target faces as viewed by the scanner is employed to correct measurement errors arising from the target not being perpendicular to the scanning beam.

7. A laser measurement system according to claim 1, where in the target comprises a pair of flat target faces each having a known width and redundant patterns of vertical and slanted retro-reflective stripes, the flat target faces being joined at an angular bend having a semi-cylindrical shape of a known width covered by a retro-reflective stripe
   wherein the difference between the time it takes the scanning beam to traverse the semi-cylindrical stripe is employed to correct measurement errors arising from the target not being perpendicular to the scanning beam.

8. A laser measurement system according to claim 1, wherein the target face comprises a pair of flat target faces positioned at a known angle to one another, each flat target face having a known width and redundant patterns of vertical stripes for denoting the width of the target face and slanted retro-reflective stripes, the flat target faces being joined at an angular bend having a semi-cylindrical shape of a known width covered by a retro-reflective stripe;
   wherein, both the time it takes the scanning beam to traverse the semi-cylindrical stripe and the difference between the time it takes the scanning laser beam to traverse the relative widths of the target faces as viewed by the scanner are employed to correct measurement errors arising from the target not being perpendicular to the scanning beam is employed to correct measurement errors arising from the target not being perpendicular to the scanning beam.

9. A laser measurement system for determining the three-dimensional position of a target in space, the system comprising:

a rotating laser scanner having a single scanning laser beam having a known constant speed of rotation and a reference position; the scanner further including detection optics for detecting reflected light from the laser beam a plurality of retro-reflective targets each having a target face with a known target width, a known pattern of slanted retro-reflective stripes on the target face, retro-reflective stripes at the vertical edges of the target face to denote its width, and mean for positioning the target in three-dimensional space, wherein the time interval between light reflected by the retro-reflective stripes at the vertical edges of the target is sensed by the scanner detection optics to determine the time it takes the scanning laser beam to traverse the known width of the target face to provide distance position data for each target;

wherein the time interval between light reflected by the slanted retro-reflective stripes is sensed by the scanner detection optics to determine vertical position data of the laser scanning beam on the target face;

wherein the time interval between the scanner reference position and light reflected from each target is sensed to determine the angular position of each target relative to the scanner reference position; and wherein each target face is cylindrically shaped;

positioning means for positioning each target within view of the scanning laser beam; and means for receiving position data from all the targets to determine an actual position each target in three dimensional space.

10. A laser measurement system according to claim 9, wherein the target further includes a connection means for connecting the target to the positioning means.

11. A laser measurement system according to claim 9, wherein the target face comprises a pair of flat target faces positioned at a known angle to one another, each flat target face having a known width and redundant patterns of vertical stripes for denoting the width of the target face and slanted retro-reflective stripes, the flat target faces being joined at an angular bend;

wherein the difference between the time it takes the scanning laser beam to traverse the relative widths of the target faces as viewed by the scanner is employed to correct measurement errors arising from the target not being perpendicular to the scanning beam.

12. A laser measurement system according to claim 9, where in the target comprises a pair of flat target faces each having a known width and redundant patterns of vertical and slanted retro-reflective stripes, the flat target faces being joined at an angular bend having a semi-cylindrical shape of a known width covered by a retro-reflective stripe wherein the difference between the time it takes the scanning beam to traverse the semi-cylindrical stripe is employed to correct measurement errors arising from the target not being perpendicular to the scanning beam.

13. A laser measurement system according to claim 9, wherein the target face comprises a pair of flat target faces positioned at a known angle to one another, each flat target face having a known width and redundant patterns of vertical stripes for denoting the width of the target face and slanted retro-reflective stripes, the flat target faces being joined at an angular bend having a semi-cylindrical shape of a known width covered by a retro-reflective stripe;

wherein, both the time it takes the scanning beam to traverse the semi-cylindrical stripe and the difference between the time it takes the scanning laser beam to traverse the relative widths of the target faces as viewed by the scanner are employed to correct measurement errors arising from the target not being perpendicular to the scanning beam is employed to correct measurement errors arising from the target not being perpendicular to the scanning beam.

\* \* \* \* \*